Sept. 9, 1969  T. A. McLAUCHLAN ETAL  3,465,794
BAND MILL
Filed Feb. 23, 1966  3 Sheets-Sheet 1
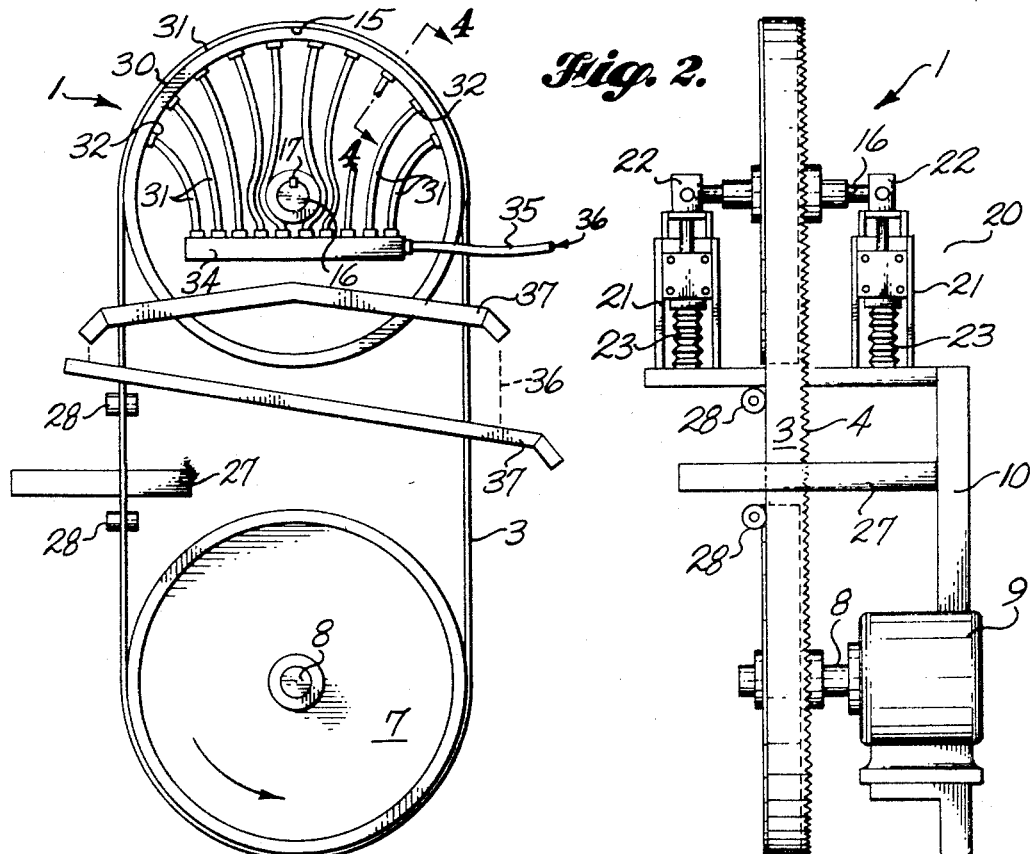
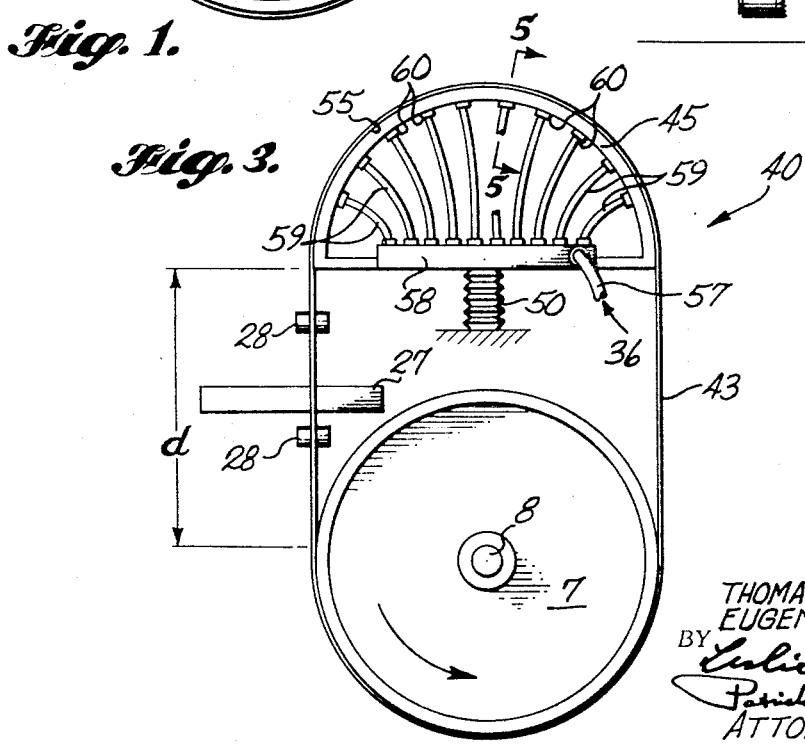
INVENTORS
THOMAS A. McLAUCHLAN
EUGENE W. ARNOLD
BY
ATTORNEYS

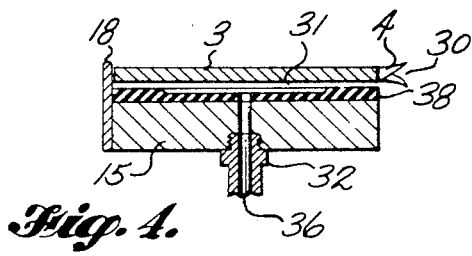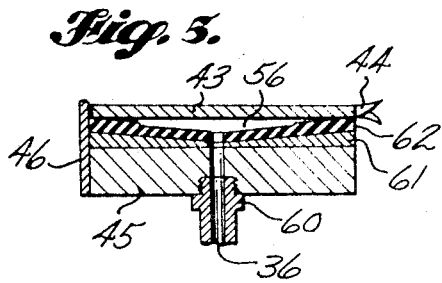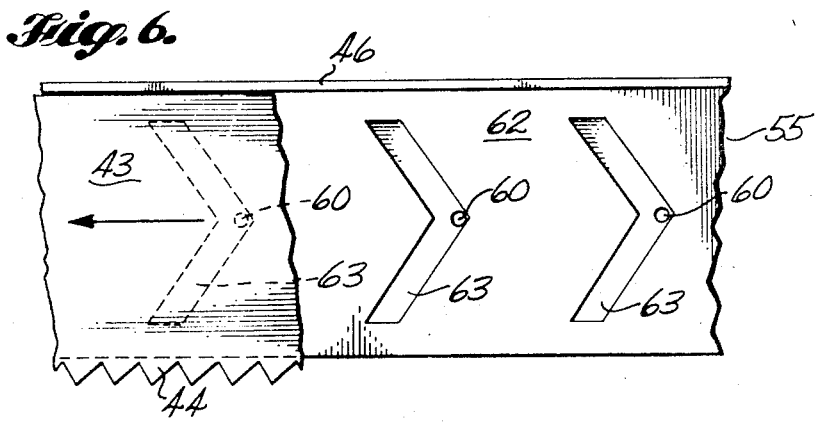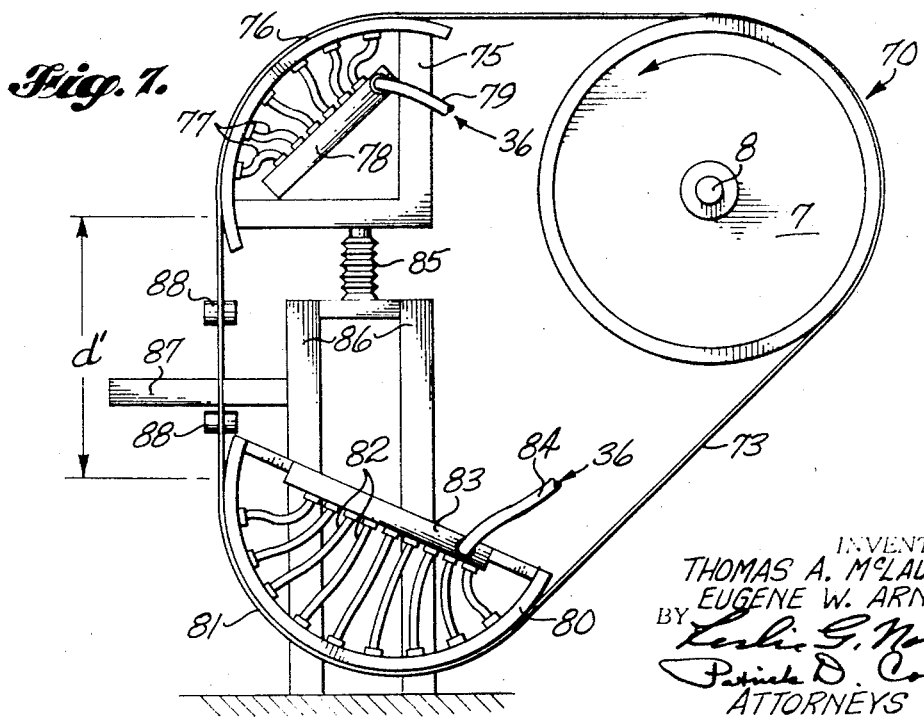

Sept. 9, 1969  T. A. McLAUCHLAN ETAL  3,465,794

BAND MILL

Filed Feb. 23, 1966  3 Sheets-Sheet 3

INVENTORS
THOMAS A. McLAUCHLAN
EUGENE W. ARNOLD
BY
ATTORNEYS

United States Patent Office 3,465,794
Patented Sept. 9, 1969

3,465,794
BAND MILL
Thomas A. McLauchlan and Eugene W. Arnold, Longview, Wash., assignors to Weyerhaeuser Company, Tacoma, Wash., a corporation of Washington
Filed Feb. 23, 1966, Ser. No. 529,302
Int. Cl. B27b 13/12
U.S. Cl. 143—17                                7 Claims

ABSTRACT OF THE DISCLOSURE

A band saw apparatus having an improved supporting bearing structure which reduces vibration of the saw blade, allows a decrease in the overall height of the apparatus, reduces the tensioning reaction time, and reduces the unsupported length of the band saw. The improved bearing structure comprises a non-rotatable, curvilinear support having a low friction surface material over which the saw blade is trained, the saw blade being maintained substantially out of contact with the surface material by a fluid film distributed under pressure over the surface material through fluid passageways.

---

The present invention concerns band mills and, in particular, a brand mill with an improved band saw support structure.

While the use of continuous band saws to cut materials such as lumber and logs has been known for several years, the basic band mill machine for supporting, guiding and driving the band saw has not been changed in its configuration to any significant degree for a number of years. A characteristic band mill includes a lower band wheel which supports and drives the continuous band saw and an upper band wheel which supports the upper end of the band saw, performing the function of an idler wheel being driven solely by frictional engagement of the band saw therewith. Such a typical band mill is shown and described in the U.S. patent to Mater, No. 3,158,184, which issued Nov. 24, 1964.

As the upper band wheel of the typical band mill rotates, it induces certain vibrations into the band saw. These vibrations cause the saw to produce rough and uneven cut surfaces in the material being cut. In addition, vibrations cause wear and induce slippage and misalignment of the parts making up the band mill.

Once a cutting load is applied to the band saw by its engagement of the material being cut, there is a deceleration of the band caused by the additional load. As a result of this deceleration and due to the moment of inertia of the idler band wheel, a loss of tension is experienced in the band saw above the material being cut. Consequently, the band saw has a tendency to distort laterally until the slack in the band is taken up by means of a tensioning device. The overall result of this variation in lateral alignment of the band is that the material is cut in a zigzag line until the band tension is restored. This results either in an unusable portion of material or a lessening in thickness of usable material. Since the idler wheel must be dsplaced away from the driven wheel to reduce the slack in the band saw, it is necessary that the mechanism for accomplishing such displacement be of a large enough size to overcome the mass of the idler wheel for such movement. Since the idler wheel and driven wheel must be aligned in the vertical plane for proper operation of the band saw, the minimum distance between the centers of the two wheels is the sum of their respective radii. Thus, the typical band mill configuration limits the minimum unsupported distance of the band saw in the area where the cuting operation takes place.

It is the object of the present invention to provide a band mill apparatus which has an improved band saw supporting means which reduces the vibration of the band saw, eliminates the rotational moment of inertia of an idler wheel and its resulting snaking action on the band saw, decreases the overall height of the band mill, reduces the unsupported length of the band saw, and reduces the tensioning reaction time, thus resulting in greater accuracy in cutting, smoother cut surfaces, reduced kerf and improved effectiveness in band mill operation.

It is a further object of this invention to provide an improved support bearing for use in a band mill.

It is still a further object of this invention to provide a multiple band mill system which permits close alignment between the cutting faces of adjacent band saws in the system.

These and other related features, objects and advantages of the present invention will become more fully apparent as the following description is read in conjunction with the accompanying drawings, wherein:

FIGURE 1 is a side elevation of a band mill constructed in accordance with the present invention, with some parts omitted for clarity;

FIGURE 2 is a front elevation of the band mill of FIGURE 1, with some parts omitted for clarity;

FIGURE 3 is a side elevation of another form of the present invention;

FIGURE 4 is a partial section taken partially along line 4—4 of FIGURE 1;

FIGURE 5 is a partial section taken substantially along line 5—5 of FIGURE 3;

FIGURE 6 is a layout of a portion of the band support surface constructed in accordance with the present invention;

FIGURE 7 is a side elevation of still another form of the present invention;

Figure 8:
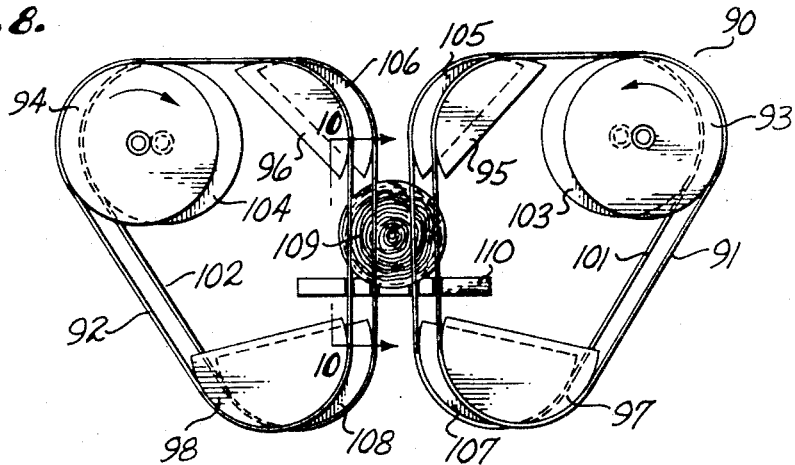
FIGURE 8 is a side elevation of a system using four of the band mills of FIGURE 7, with some parts omitted for clarity.

Referring to the drawings with more detail, there is seen in FIGURES 1 and 2 the general arrangement of the band mill 1. The basic components of the band mill 1 are the band saw 3, the drive wheel 7, the band support 15, the band tensioning system 20, and the saw table 27.

The band saw 3 includes teeth 4 and is supported by drive wheel 7 and band support 15. The drive wheel 7 is mounted on axle 8 and is rotated by means of a suitable motor 9 which is supported on base 10. The band support 15 is novel in that it is keyed to axle 16 by means of key 17 in a manner so that the band support 15 is not permitted to rotate. The axle 16 is suitably supported and is movable relative to drive wheel axle 8 by means of a tensioning system 20. Conventional pretensioning counterweights or spring means may be provided to place a sufficient tension on the band saw 3 for proper operation. A suitable tensioning system is disclosed in the aforementioned patent to Mater. It may include vertical guides 21 and axle supports 22 which, through the operation lifting means 23, vertically positions the band support axle 16 relative to the drive wheel axle 8 to take up any slack that might develop in the band saw 3.

A saw table 27 may be provided with suitable infeed and offbearing feed conveyors (not shown) to provide support for the material being sawn by the band mill 1. Suitable backup bearings 28 may be placed near the back edge of the band 3 adjacent the saw table 27 to further increase stability of the band saw 3 and to provide a positive safety guard to prevent the band 3 from leaving the band support 15.

A low friction surface 30 is provided on the curvilinear portion of the band support 15 which is in contact with the band saw 3. A suitable low friction surface 30 can be provided by means of a fluid film 31 which is established by a fluid 36, such as water, being supplied to the surface of band support 15 through fluid nozzles 32, conduits 31, and a manifold 34 which receives the lubricating fluid 36 through a supply conduit 35. The excess lubricating fluid 36 may be caught by drip pans 37 so that it does not interfere with the drive system of the band mill.

The operation of the first version of the improved band mill 1 is relatively straightforward. The drive motor 9 rotates the drive axle 8 to cause the drive wheel 7 to rotate in the direction shown by the arrow and thus moves the band saw 3 so that it transits across the low friction surface 30 of the band support 15 which is held so that it will not rotate as the band saw 3 passes over it. As material is fed to the moving band saw 3, it is cut by means of the teeth 4. Since the band support 15 is not rotating, there is no moment of inertia, characteristic of the idler wheel in previously known band mills. To counteract the slack caused by the deceleration of the band saw 3 due to the initial cutting load, the tensioning system 20 acts quickly by moving the band support 15 away from the drive wheel 7. The passage of the band saw 3 across the low friction surface 30 of the band support 15 is virtually free of vibration.

Referring now to the modified band mill 40 as shown in FIGURE 3, there is seen that the band saw 43 may be reduced in length due to the reduction of the distance between the drive wheel 7 and the half-wheel band support 45. The tensioning system 50 may be of a similar construction to the tensioning system 20 shown in FIGURES 1 and 2. Similarly, the low friction curvilinear surface 55 may be provided with a fluid film 56 which is supplied by a fluid 36 through supply conduit 57 to manifold 58 and individual conduits 59 to the individual nozzles 60. It should be noted that one of the major features of the modified band mill 40 is the reduction of the unsupported distance $d$ between the half-wheel band support 45 and the surface of the drive wheel 7. Another important feature of this modification is the reduction of the overall mass of the band support 45 which provides even quicker reaction time by means of the tensioning system 50. In all other respects the modified band mill 40 operates in a similar manner to the band mill 1, shown in FIGURES 1 and 2.

Referring now to FIGURE 4, there is shown a cross-section of the band support 15 along lines 4—4 in FIGURE 1. While the construction details of the band support can be varied, FIGURE 4 shows one design which has operated successfully. This includes the provision of edge guide 18 on one side of the band support 15 extending above its surface to provide a positive means for retaining the band saw 3. Between the band saw 3 and the band support 15 is the fluid film 31 which results from the pumping of a lubricating fluid 36 through the nozzle 32 to an opening which is defined by a low friction surface 38 which is in direct contact with the band support 15. Neoprene has been found to be an acceptable low friction surface material.

When the band mill has been shut down and then started again, the saw 3 is in direct contact with the low friction surface 38 until the fluid film 31 is established. It should be noted that when a band saw is used which has teeth on both sides, a positive edge guide such as 18 cannot be used.

The low friction fluid lubrication can be accomplished by a full-pressure system that pumps a lubricating fluid, such as water, between the moving band saw and the low friction bearing surface. While water is a very suitable lubricant for band saw utilization, other working bands and extreme weather and speed conditions might require lubricating fluids having different physical properties than water.

An alternate construction for the band support is the half-wheel support 45 shown in FIGURE 5, which is a section view through lines 5—5 of FIGURE 3. Here the low friction surface 55 is provided between the band saw 43 and the half-wheel band support 45 by means of a fluid film 56. The fluid film 56 results from the pumping of lubricating fluid 36 through the nozzle 60 into the vessel formed by the low friction surfacing material 62 which is separated from the surface of the half-wheel band support 45 by suitable shims 61. The cross-section of the surface of the shims 61 is designed to stabilize and control the lateral position of the band saw 43. As shown, the slightly concave bed has been found to work satisfactorily. The edge of the band saw 43 remote from the saw teeth 44 may be guided along the edge guide 46 which is secured by suitable means to the half-wheel band support 45.

FIGURE 6 shows a layout of a portion of the low friction surface 55 with part of the band saw 43 removed. As shown, the low friction surface material 62 has been partially cut away in areas adjacent to the individual nozzles 60 to form tapered herringbone vessels 63. The function of the vessels 63 is to distribute the lubricating fluid 36 across the width of the low friction surface 55 as the band saw 43 moves in the direction shown by the arrow to form fluid film 56.

To illustrate the feedom of design provided by the low friction supports taking the place of rotating idler wheels, FIGURE 7 shows a three-point support band mill 70. The band saw 73 is driven by conventional drive wheel 7 which is mounted on drive axle 8. The band saw 73 is suspended across the upper band support 75 and its low friction surface 76, and then down to the lower band support 80 in contact with its low friction surface 81. Low friction surface 76 for the upper band support 75 is provided with a lubricating fluid 36, which is supplied through conduits 77 from the manifold 78 and from the supply conduit 79. Likewise, the low friction surface 81 of the lower band support 80 is supplied with lubricating fluid 36 through conduits 82 from the manifold 83 and ultimately from the supply conduit 84. The tensioning means 85 is mounted on frame 86 to take up any slack that might develop in the band saw 73. The material being cut by the band saw 73 is conveyed upon the saw table 87 and the band saw 73 may be provided with additional backup support by backup bearings 88 above and below the saw table 87. It should be noted that the unsupported distance $d'$ of the band saw 73 between the upper band support 75 and lower band support 80 has been significantly reduced from that generally known in the band mill art, thus providing a significant increase in the stiffness of the band saw 73 in the cutting area.

The flexibility of design available when utilizing the three-point support band mill 70 of FIGURE 7 is well illustrated in FIGURE 8 which shows a quad-band mi'l assembly, utilizing four of the three-point support band mills 70 to make four cuts at one time in a log. As shown, a right forward band saw 91 is mounted upon and driven by drive wheel 93 and supported by upper support 95 and lower support 97. In the same vertical plane but to the left is located left forward band saw 92 which is mounted upon and driven by drive wheel 94 and additionally supported by upper support 96 and lower support 98. Spaced to the rear and positioned an increment toward the center of the sawing area of right forward band saw 91 is right rear band saw 101 which is mounted upon and driven by drive wheel 103 and additionally supported by upper support 105 and lower support 107. In the same vertical plane on the left side is the left rear band saw 102 which is mounted upon and driven by drive wheel 104 and additionally supported by upper support 106 and lower support 108. All of these saws may be moved relative to one another to cut various thicknesses from the log 109 which is conveyed past the saws on log table 110.

Figure 9:
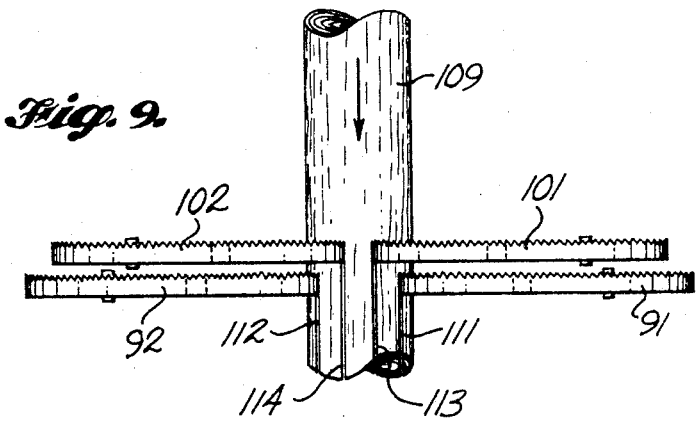
FIGURE 9 is a plan view of the assembly of FIGURE 8.
Figure 10:
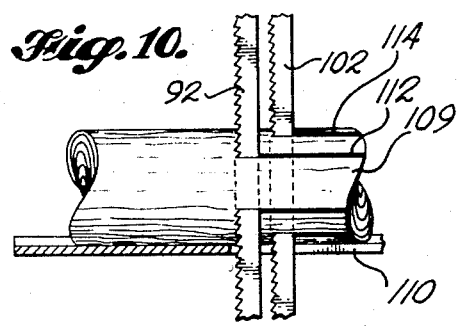
FIGURE 10 is a partial section taken substantially along line 10—10 of FIGURE 8.

As shown in FIGURE 9, the right forward band saw 91 is positioned quite close to the right rear band saw 101 which assists in eliminating any parallel alignment variation between the right forward cut 111 and the right rear cut 113. In a similar manner, the left forward band saw 92 is positioned close to left rear band saw 102 so as to eliminate misalignment between the left forward cut 112 and the left rear cut 114. This is also shown on the side elevation view illustrated in FIGURE 10. It has been found that when combining two or more band saws to make multiple cuts, it is advantageous to position the saws as close together as is possible along the plane of the cuts. By positioning the saws in this manner, as shown in FIGURES 8 through 10, the material being cut is given less opportunity to shift position before the successive saws can make their cuts. Because the band mills made in accordance with the present invention are independent from large supporting wheels and axles, this design is very well suited for use in making multiple cuts.

In one installation of a band mill having a design substantially the same as that shown in FIGURES 1 and 2, a four-inch wide continuous band saw was operated successfully at a speed of approximately 10,000 f.p.m. The low friction surface was provided by means of a water film which was pumped through the supply conduit 35 at a pressure between 20 and 40 p.s.i. With this installation, speeds as high as 18,000 f.p.m. have been attained with a substantial reduction in the vibration of the band and thus less kerf resulted than was the case when the band support 15 was permitted to rotate as an idler wheel in the manner of the conventional band mill.

From the foregoing it is seen that all of the improved designs of the band mill herein disclosed provide several distinct advantages over conventional idler wheel band mills. Most notable among these advantages is the significant reduction in the snaking of the band saw and the resulting out-of-line cutting. This is accomplished by the elimination of the rotating inertia of the upper band idler wheel. A second major advantage is the reduction of kerf width due to the reduction in the vibration of the band, which, in addition, results in a smoother cut surface. By using the band mill design shown in FIGURES 3 to 10, there is a significant reduction in machine height, and an increase in band saw stiffness due to the reduction of unsupported distance for the band. This additional stiffness provides an additional reduction in out-of-line cutting. The reduction in weight of the band supports permits the pretensioning devices to attain faster reaction times, which again results in less out-of-line cutting.

It is, therefore, seen that we have disclosed a significantly improved band mill apparatus which in operation causes less vibration, increased accuracy, reduced kerf, reduced overall height, and increased flexibility in arrangement and adjustment of multiple band mills.

Having thus described our invention, what we claim and desire to protect by Letters Patent is:

1. In a band saw apparatus having a frame, a drive wheel mounted for rotary movement on said frame, a curvilinear saw blade support means mounted on said frame, a saw blade trained over said drive wheel and said support means, said support means being adjustable for varying the distance between the drive wheel and support means, said support means comprising a non-rotatable support member including a surface of low friction material over which said saw blade is trained, said saw blade maintained out of contact with said low friction surface by a fluid film.

2. The apparatus of claim 1 wherein said non-rotatable support member includes fluid passageways open to the surface over which said saw blade is trained.

3. The apparatus of claim 2 including means for delivering fluid under pressure through said fluid passageways.

4. The apparatus of claim 1 wherein said surface of low friction material is contoured in a concave cross-section.

5. The apparatus of claim 4 wherein said surface of low friction material includes a neoprene surface material supported by said support means and defining tapered herringbone vessels.

6. The apparatus of claim 1 wherein said support means includes two saw blade support members disposed one above and one below the cutting area of said band saw.

7. The apparatus of claim 1 wherein the distance between the point on said support means most remote from said drive wheel and the point on said drive wheel most remote from said support means is less than the sum of the diameter of said support means and said drive wheel.

References Cited
UNITED STATES PATENTS

| | | | |
|---|---|---|---|
| 81,434 | 8/1868 | Thompson. | |
| 721,966 | 3/1903 | Prescott et al. | 143—21 |
| 2,683,635 | 7/1954 | Willcox. | |
| 3,097,971 | 7/1963 | Carlisle et al. | |
| 3,156,399 | 11/1964 | Wadey. | |
| 3,225,801 | 12/1965 | Dunn et al. | 143—160 |

DONALD R. SCHRAN, Primary Examiner